April 20, 1926.
H. F. CUNTZ
1,581,516
STRUT ROD FOR MOTOR VEHICLES
Filed Sept. 29, 1921　　3 Sheets-Sheet 1
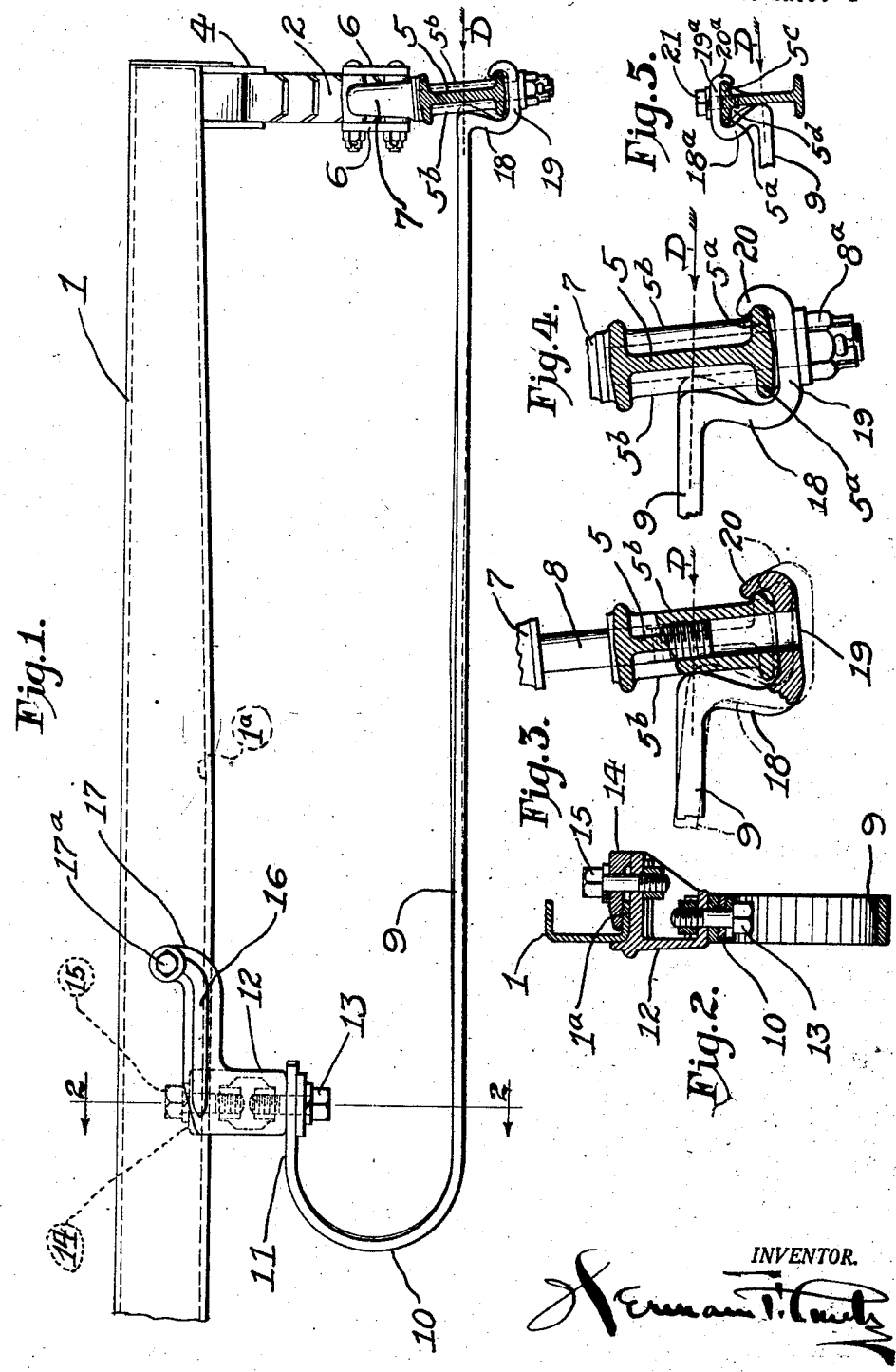
INVENTOR.

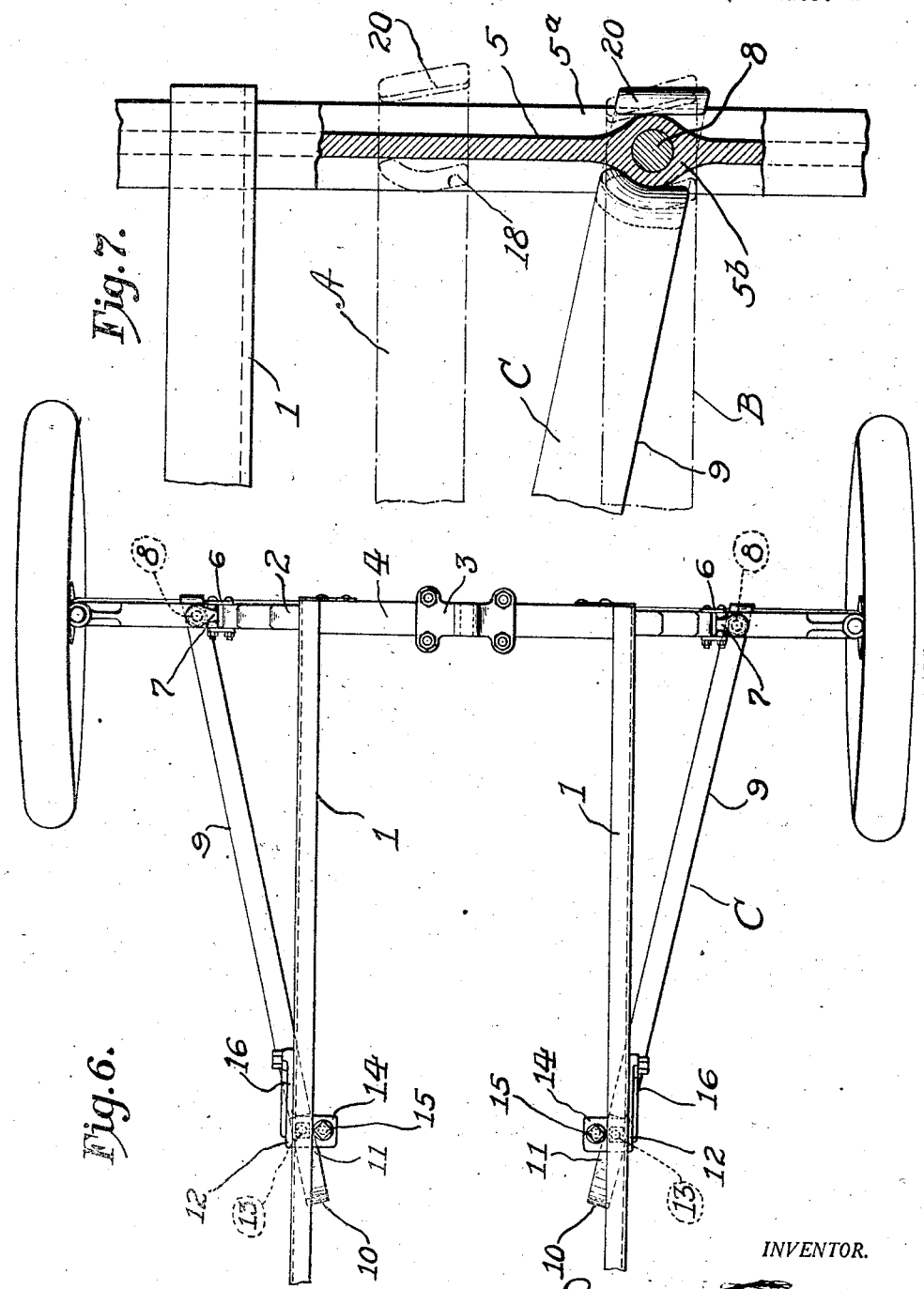

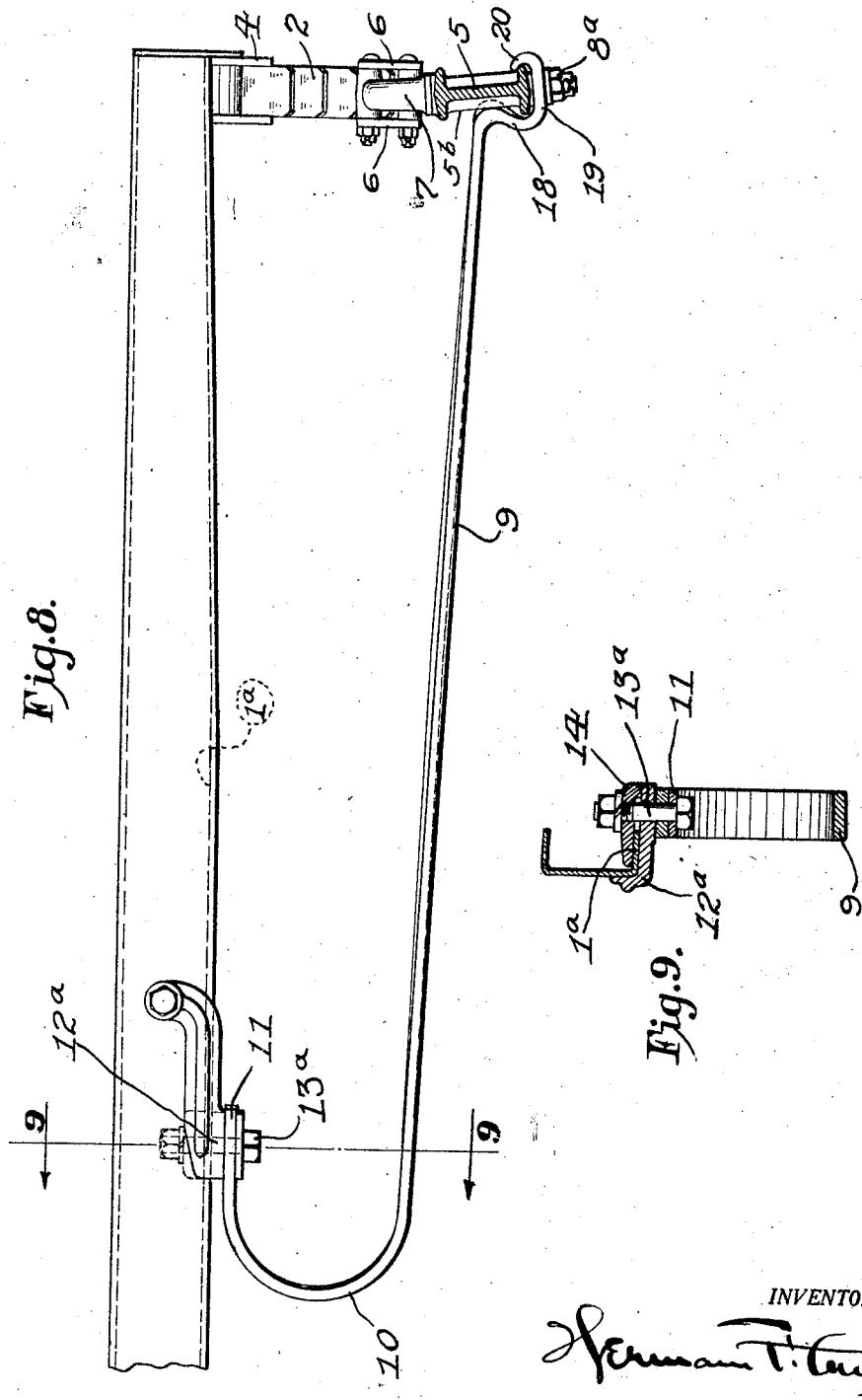

Patented Apr. 20, 1926.

1,581,516

UNITED STATES PATENT OFFICE.

HERMANN F. CUNTZ, OF HARTFORD, CONNECTICUT.

STRUT ROD FOR MOTOR VEHICLES.

Application filed September 29, 1921. Serial No. 504,210.

*To all whom it may concern:*

Be it known that I, HERMANN F. CUNTZ, a citizen of the United States, residing in the city of Hartford, county of Hartford, and State of Connecticut, have invented certain new and useful Improvements in Strut Rods for Motor Vehicles, of which the following is a specification, reference being had to the accompanying drawings, illustrative of one particular embodiment of my invention.

This invention relates to the part of a vehicle which serves the purpose of maintaining a predetermined horizontal position of an axle with respect to the frame or the body of a vehicle, the part being generally referred to as a strut or distance rod or bar, and in some of its applications it may serve as what is called a radius rod.

Such member serves to connect and carry the strains imposed on the axle to the vehicle frame or body, while at the same time permitting the limited motion vertically which it is desired to permit between axle, main frame or body, or vice versa, which must occur to accommodate irregularities of road surface when the vehicle is in motion, as well as the load weight of the body. The particular type of strut bars or rods involved are similar to those set forth in United States Letters Patent No. 1,360,925, granted November 30, 1920, this application involving in general detailed developments of that type of strut rod, and features of construction that may be used therewith or independently.

In particular, a strut rod construction is provided with facility for attachment to the axle, advantages in the position and method of attachment, and other advantages in construction and use as may appear from the more detailed description hereinafter set forth.

To illustrate an embodiment of my invention, forms of construction are shown in the accompanying drawings, in which:

Fig. 1 is a side view of the forward end of a vehicle frame with strut rod connected with axle, in elevation.

Fig. 2 is a section at 2—2 of Fig. 1.

Fig. 3 is a vertical section of the front axle, part fragmentary, at the point of attachment of the end of a strut rod, showing a step in the act of attaching.

Fig. 4 is a similar section of front axle showing the front end of strut secured to the axle.

Fig. 5 is a modified form of attachment of strut to axle.

Fig. 6 is a plan view of front axle with pair of strut rods attached.

Fig. 7 is a top view of front axle near one end showing steps in the application and attachment of one strut rod.

Fig. 8 is an elevation in front end of vertical frame and axle with strut rod attached, modified in some detail.

Fig. 9 is a sectional view taken on line 9—9 of Fig. 8.

Vehicle frame members 1—1 have the transverse front spring 2 secured at the middle by a bracket 3 to a yoke 4, with the front axle 5 connected by the spring shackles 6 to a spring perch 7, having a shank 8 passing through the axle.

The main strut member 9 is secured to the axle 5 at its front end, while a curved section 10 with a reverse flat portion 11 is clamped to the bracket 12 by bolt 13, and the bracket 12 is clamped by clip 14 and bolt 15 to the flange $1^a$ of the frame member 1. The bracket has an integral arm 16 with an ear 17 and a bolt $17^a$ securing it to the web of the frame 1.

The forward end of main strut member 9 has a curved section 18 with attaching section 19 terminating in a hooked end 20 adapted to engage the lower flange $5^a$ of the axle. As shown in Figs. 3 and 7, the hook 20 and the curved portion 18 of the front end of the strut are inserted from the bottom of the axle over the flange as shown in position A, by the step indicated in dotted lines in Fig. 3, showing a slight inclination of the front end as a means of twisting the front end of the strut into an engaging position. The front end of the strut is then moved to position B, Fig. 7, where it engages boss $5^b$ of the axle, and then turns to the position C which is the final position as shown in Fig. 6, of the desired angularity of the strut with respect to the axle, and in which position the hook end 20 is brought into parallel engagement with the edge of the lower flange $5^a$ of the axle, while the strut portion 18 is brought into close contact with the surface of the axle boss $5^b$. In this position the spring perch 7 has its shank 8 pushed through the hole in the end of the strut portion 19 and nut $8^a$ is then secured, adding to the security of the strut end by firmly clamping section 19 against the lower face of the axle.

As thus attached the strut section 9 is in alignment horizontally, as shown by arrow D, with a portion of the axle between the top and bottom flanges, and the exact position of such engagement can be made to coincide horizontally with the direction or the resultant direction of shock to which the front axle is liable to be subjected. If the horizontal level of shock on the front axle is slightly above the engaging resistance of the front end of the strut 9, any tendency to twist the front axle resulting therefrom, will be resisted by the hook 20 at the extreme end of the strut.

As shown in Fig. 5 the forward end may be of a reverse or up-turn 18ª in the strut, with a straight section 19ª and the hook 20ª turned downward, and in this form the front end of the strut serves for holding the top flange 5ᶜ in predetermined relation with the front end of the strut 9. Under the flange 5ᶜ at the point of attachment, a web or boss 5ᵈ is preferably formed in the forging of the axle to provide for a hole tapped to receive the bolt 21. This form of attachment would apply where there is no spring perch or spring perch boss common in certain forms of front axle construction; and this arrangement applies where the horizontal shock or force of impact on the axle is likely to be below the central or axial resistance of the strut 9, in which case the top flange axle connection prevents, by the hook 20ª, any tendency of the front axle to twist to such shock. In either case, engagement of the lower flange or upper flange 5ª of the axle with the bent members of the forward end of the strut, in addition to the bolt 21 or the shank 8 of the spring perch, or their equivalent, provide a combined strut end attachment and what is sometimes called an "axle range" or member resisting the twisting of the axle on the axis of the axle or axis of the wheels. Thus in the varying positions due to the spring in the strut, with the relative motion of the axle with relation to the frame 1, the extremely simple form of strut rod has combined with it the additional security attaching means for maintaining the desired predetermined relation of axle with the strut.

As shown in Fig. 8, the strut may be crimped to form a stiffened section through the major portion of the strut section 9, and the reverse curve 10 may be clamped to bracket 12ª so formed that one bolt 13ª secures the end 11 of the strut spring member by means of clamp 14, directly to the flange 1ª of the sill.

By the form of attachment of the strut at the end to its axle it will be seen that twisting strains on axle are resisted, which otherwise would have to be borne by the shackles 6, thereby taking the strain which would otherwise cause wear and possibly a break at the connections with the spring 2, and in any event providing for the proper functioning of shackles and spring ends, and consequently a more normal action of the spring 4 to serve its load-carrying flexible function, than would otherwise be possible if the shackles were subject constantly to strains which this construction helps to avoid.

Furthermore, with the front strut and engagement a far greater horizontal resistance is provided than when the horizontal shock is resisted solely by a bolt or shank of the spring perch. As will be evident from Fig. 6, the shock on one wheel at one side of the vehicle will be transmitted through both points of attachment of the struts in view of the engagement of the front struts with an ample bearing on the flange edges of the front axle. The fit of the front end of the struts with the front axle will, furthermore, more securely provide for holding the front axle in predetermined alignment transverse to the frame and parallel with the plane of the load-carrying spring 2.

While various modifications may be made without departing from the spirit of my invention, what I claim and desire to secure by Letters Patent is:

1. In combination with an automobile, a front axle, a main frame and a load-spring between the axle and frame end, a pair of strut rods of the character described each having a curved integral spring section, means of rigid attachment to the main frame and a substantially straight strut section merging into said spring section, a claw end rigidly associated with the front end of each strut flange formed for insertion over a flange on the front axle when the strut is in abnormal position and to rigidly engage said flange of the front axle when the opposite end of the strut is in normal position regidly secured to the main frame.

2. A strut rod of the character described in combination with an axle, a flange on said axle, a preformed double hooked end formed in the end of the strut at its axle engaging end embodying means whereby the hooked portion may be inserted on the axle flange with the strut in abnormal position, and rigidly engage said flange when the other end of said strut is shifted to less than a right angle with respect to the axle and into the normal precision of permanent attachment for use between the axle and the main frame.

3. A pair of strut rods in combination with an automobile forming the support for the front axle relative to the main frame, comprising two complementary spring bars each diverging from a rigid attachment to the main frame laterally outward to a rigid attachment to the front axle and joining the front axle at an oblique angle, a preformed integral double-hooked end to each strut adapted to clip over the flange of the angle when the strut is held substantially at right angles thereto and permit loosely positioning said end on the axle, said preformed complementary hooks adapted to engage rigidly the axle flange and web when the strut is inclined from the right angle to an oblique angle with the front axle, namely in its normal position for rigid connection with the frame, substantially as shown.

4. A pair of strut rods for tying and resisting compression between a front axle and the main frame sills of an automobile, comprising each a spring bar with an integral end adjacent fixed means for attachment to the sill, integral fixed opposed hook means formed of the bar proper at the axle attachment end, said hooks being so formed that the strut rods may be loosely hooked over the axle flange when at substantially right angles to the axle and rigidly locked to the axle by an angular displacement throwing the rear end position for attachment to the sill and adapted for release from the axle when again shifting the remote end of each strut rod to a position substantially at right angles to the axle.

This specification signed and witnessed this 28th day of September, 1921.

HERMANN F. CUNTZ.